No. 869,364. PATENTED OCT. 29, 1907.
L. A. HAWKINS.
AIR BRAKE SYSTEM.
APPLICATION FILED FEB. 3, 1906.
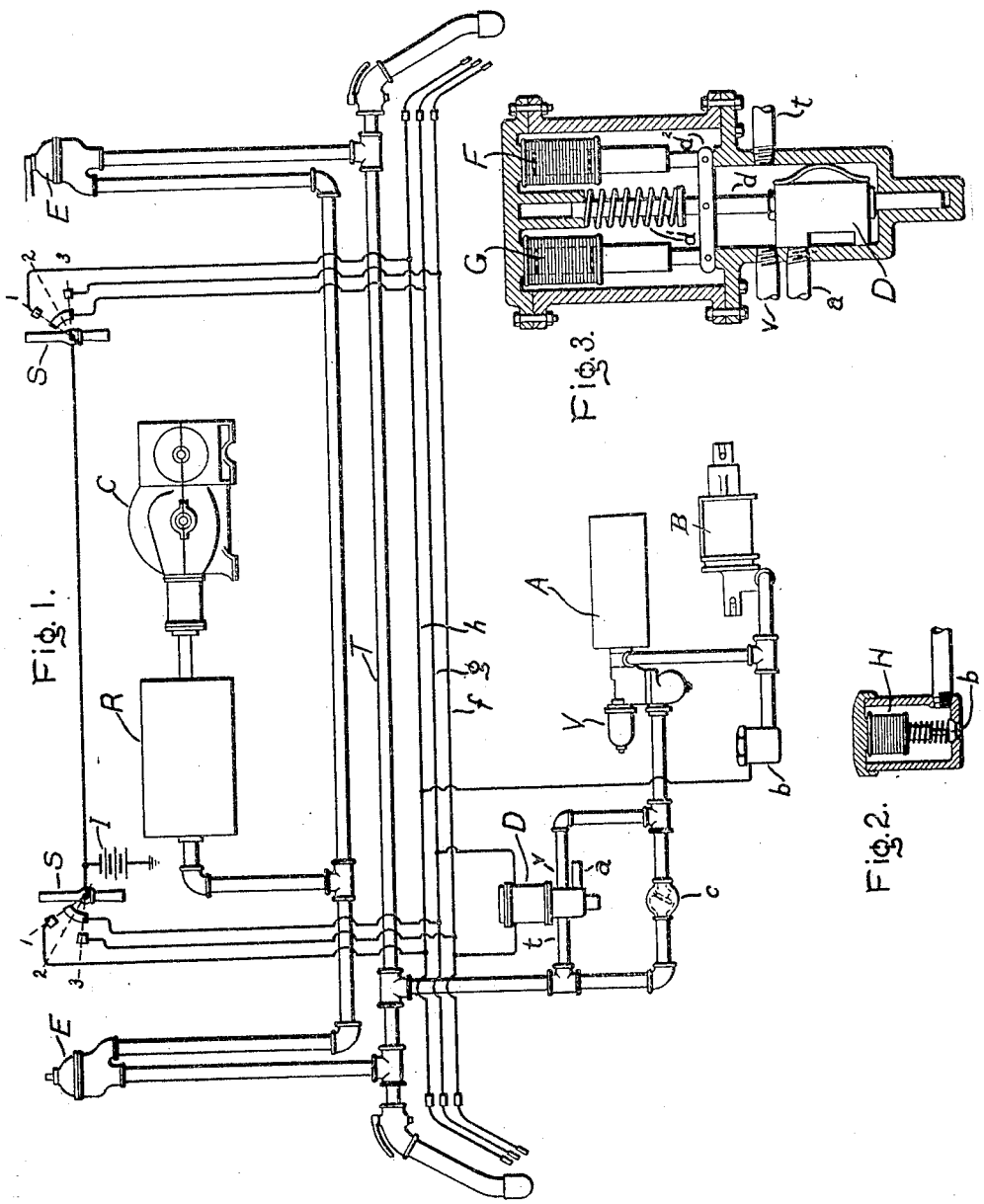
Witnesses:
Burchard V. Kelley
Helen O. ford
Inventor:
Laurence A. Hawkins.
by Albert G. Davis
Atty.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

AIR-BRAKE SYSTEM.

No. 869,384.　　　　Specification of Letters Patent.　　　　Patented Oct. 29, 1907.

Application filed February 3, 1906. Serial No. 299,257.

*To all whom it may concern:*

Be it known that I, LAURENCE A. HAWKINS, a citizen of the United States, residing at Schenectady, in the county of Schenectady, State of New York, have invented certain new and useful Improvements in Air-Brake Systems, of which the following is a specification.

My invention relates to automatic air-brake systems, and consists in an improvement in the system shown in Patent No. 359,593, issued to Carpenter, March 22, 1887. That patent shows an automatic air-brake system and electrically-operated valves,—one for connecting the train-pipe side of the triple valve piston to atmosphere to apply the brake so as to obtain simultaneous application of the brakes throughout the train, and another for controlling the exhaust from the brake cylinder so as to secure a graduated release. In the arrangement shown in the Carpenter patent, the train-pipe pressure is lowered every time that the brakes are applied.

My invention consists in arranging the electrically-operated valve mechanism to disconnect the triple valve from the train-pipe when the train-pipe connection of the triple valve is connected to atmosphere. In this manner, the pressure in the train-pipe is not reduced when the brakes are applied electrically, and a saving of air results.

If, while the train-pipe were disconnected from the triple valve by the electric valve, the electric valve should stick and the train should break apart, an emergency application of the brakes would not be produced; or if current should fail and the electric valve should stick while in lap-position, the brakes could not be applied pneumatically. In order to prevent any danger from this source, my invention further consists in providing a by-pass around the electric valve with a check-valve arranged to permit the flow of air only from the triple valve to the train-pipe. The train-pipe is thus always connected to the triple valve, as far as applications of the brake are concerned.

My invention will best be understood by reference to the accompanying drawings, in which Figure 1 shows diagrammatically an air-brake system arranged in accordance with my invention; and Figs. 2 and 3 show cross-sectional detail views of the electric valves.

In the drawings, E E represent the usual engineer's valves adapted to connect the reservoir R, which is supplied from the compressor C, to train-pipe T, or to connect train pipe to atmosphere.

V represents the triple valve, A the auxiliary reservoir, and B the brake-cylinder. Between the train-pipe T and triple valve V are two pipe connections,—one comprising the electric valve D, and the other the check-valve $c$. The check-valve $c$ is arranged to permit the flow of air from the triple valve to the train-pipe, but to prevent the flow of air in the opposite direction. The electric valve D, as shown in Fig. 3, is arranged normally to establish connections from the pipe $t$ leading from the train-pipe to the pipe $v$ leading to the triple valve. The valve D is carried on the spindle $d$, which is normally held in the position shown in Fig. 3 by the compression spring $d'$. The spindle carries a pivoted cross-piece $d^2$, to opposite ends of which are secured the cores of the magnets F and G. When one magnet is energized, it raises its core, thereby raising one end of the cross-piece $d^2$, which turns on its opposite end as a fulcrum. The valve D is thereby moved so as to close the pipe connection $v$ to the triple valve. The triple valve is thus disconnected from the train-pipe. If the other magnet is energized, the other end of the lever $d^2$ is raised, moving valve D into position to connect the triple valve pipe $v$ with the pipe $a$ leading to atmosphere, thereby exhausting the chamber on the train-pipe side of the triple valve piston.

$b$ represents a normally closed valve controlled by a magnet H and arranged when the magnet is energized to connect brake-cylinder B to atmosphere.

S S represent switches by means of which the electrically-operated valves are controlled. By these switches the train-wires $f$, $g$ and $h$ are connected to the source of current I, which in the drawings is indicated as a battery, but which in the case of electrically-operated vehicles may be the source of power-current.

The operation of the system electrically is as follows: With the switches S in the position shown, the valves D and $b$ are in the position shown in Figs. 2 and 3, and consequently the connections are exactly like those of an ordinary automatic air-brake system, and the brakes may be controlled by means of the engineer's valves pneumatically in the usual way. The dotted line 1 represents the electric release position. In this position of the switch S train-wires $h$ and $g$ are energized, thereby energizing the magnet H to connect brake-cylinder B to atmosphere and the magnet G, which pulls valve D in position to close the triple valve connection $v$. In the position represented by dotted line 2, which is the lap position in electrical operation, train-wire $h$ is deënergized, thereby deënergizing magnet H so as to close the exhaust from the brake-cylinder, while train-wire $g$ is still energized, so that magnet G holds the valve D in lap-position. The application-position of switch S is represented by dotted line 3. In this position train-wires $f$ and $g$ are energized, so that the train-pipe connection of the triple valve is connected to atmosphere. If a service application of brakes is desired, the switch S is moved to position 3 and held there long enough to reduce the pressure on the train-pipe side of the triple valve the desired amount, and then the switch S is returned to lap-position 2. The triple valve is consequently moved to application-position and remains there until the auxiliary reservoir pressure has been lowered, by discharging air into the brake-cylinder, until the pressures on opposite sides of the triple valve piston are equalized. The triple valve then returns to lap-position in the usual manner. For an emergency application, the switch S is thrown to position 3 and held there, thereby completely exhausting the chamber on the train-pipe side of the triple valve piston, so as to hold the triple valve in emergency-application position, thereby producing equalization between auxiliary reservoir and brake-cylinder. To release, the switch S is moved to position 1, thereby opening brake-cylinder to atmosphere, while maintaining the triple valve disconnected from train-pipe, and consequently in lap-position. The release can be graduated by shifting the switch S to lap-position 2 at any time during release. For full release the switch S is moved to the position shown in Fig. 1, thereby deënergizing all the magnets, reëstablishing the connection between train-pipe and triple so as to move the triple valve back to release-position.

By means of the check-valve c in the by-pass around the electrically-operated valve D, the triple valve may be actuated pneumatically to apply the brakes at any time, regardless of the position of the electrically-operated valve D. On the other hand, since, during electrical application, the train-pipe pressure is greater than the pressure on the train-pipe side of the triple valve piston, and since the check-valve c does not permit the flow of air from train-pipe triple valve, the by-pass connection does not affect the application of the brakes electrically.

While I have shown the exhaust valve b arranged as in the Carpenter patent to connect the brake-cylinder to atmosphere independently of the triple valve, this particular arrangement of the exhaust valve is not essential to my invention. In place of this normally-closed exhaust valve independent of the triple valve, a normally-open exhaust valve arranged to close the triple valve exhaust, as shown in Patent No. 574,062, Hall, December 29, 1896, may be employed, if desired. Accordingly, I do not desire to limit myself to the particular construction and arrangement of parts here shown, but aim in the appended claims to cover all modifications which are within the scope of my invention.

What I claim as new and desire to secure by Letters Patent of the United States, is:

1. In an automatic air-brake system, in combination with the train-pipe, auxiliary reservoir, triple valve, and brake-cylinder, valve mechanism for disconnecting the triple valve from the train-pipe and for connecting the train-pipe connection of the triple valve to atmosphere, and electro-magnetic operating means for said valve mechanism adapted to shift said valve mechanism in either direction.

2. In an automatic air-brake system, in combination with the train-pipe, auxiliary reservoir, triple valve, and brake-cylinder, valve mechanism for disconnecting the triple valve from the train-pipe and for connecting the train-pipe connection of the triple valve to atmosphere, electro-magnetic operating means for said valve mechanism, a connection between train-pipe and triple valve independent of said valve mechanism, and a check valve in said connection adapted to permit the flow of air only from triple valve to train-pipe.

3. In an automatic air-brake system, in combination with the train-pipe, auxiliary reservoir, triple valve and brake cylinder, valve mechanism for disconnecting the triple valve from the train-pipe and for connecting the train-pipe connections of triple valve to atmosphere to apply the brakes, electromagnetic operating means adapted to shift said valve mechanism in either direction, a valve controlling the exhaust from the brake cylinder, and electromagnetic operating means for said exhaust controlling valve.

4. In an automatic air-brake system, in combination with the train-pipe, auxiliary reservoir, triple valve, and brake cylinder, valve mechanism for disconnecting the triple valve from the train-pipe and for connecting the train-pipe connection of the triple valve to atmosphere, electro-magnetic operating means for said valve mechanism, a connection between train-pipe and triple valve independent of said valve mechanism, a check-valve in said connection adapted to permit the flow of air only from triple valve to train-pipe, and an electrically-operated valve controlling the exhaust from the brake-cylinder.

In witness whereof, I have hereunto set my hand this 2nd day of February, 1906.

LAURENCE A. HAWKINS.

Witnesses:
BENJAMIN B. HULL.
HELEN ORFORD.